United States Patent
Ohmori

(10) Patent No.: US 8,715,880 B2
(45) Date of Patent: May 6, 2014

(54) SOLID OXIDE FUEL CELL

(75) Inventor: Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 36 days.

(21) Appl. No.: 13/408,282

(22) Filed: Feb. 29, 2012

(65) Prior Publication Data

US 2012/0225369 A1 Sep. 6, 2012

(30) Foreign Application Priority Data

Mar. 3, 2011 (JP) ................................. 2011-045808
Dec. 6, 2011 (JP) ................................. 2011-266375

(51) Int. Cl.
*H01M 8/10* (2006.01)

(52) U.S. Cl.
USPC ............................ 429/482; 429/491; 429/496

(58) Field of Classification Search
USPC ......................................... 429/482, 491, 496
See application file for complete search history.

(56) References Cited

U.S. PATENT DOCUMENTS

| | | | |
|---|---|---|---|
| 2005/0026017 A1* | 2/2005 | Seabaugh et al. ............... | 429/30 |
| 2008/0248395 A1 | 10/2008 | Harada et al. | |
| 2010/0196795 A1* | 8/2010 | Ohmori et al. ................ | 429/489 |
| 2010/0310968 A1 | 12/2010 | Kluge et al. | |

FOREIGN PATENT DOCUMENTS

| | | |
|---|---|---|
| EP | 2 398 102 A1 | 12/2011 |
| EP | 2 398 103 A1 | 12/2011 |
| JP | 2003-173801 A1 | 6/2003 |
| JP | 2003-173802 A1 | 6/2003 |
| JP | 2004-119161 A1 | 4/2004 |
| JP | 2006-286403 A1 | 10/2006 |
| JP | 2010-003478 A1 | 1/2010 |

OTHER PUBLICATIONS

Extended European Search Report dated May 4, 2012.

* cited by examiner

*Primary Examiner* — Jane Rhee
(74) *Attorney, Agent, or Firm* — Burr & Brown, PLLC

(57) ABSTRACT

Provided is a solid oxide fuel cell (SOFC), including: a fuel electrode for allowing a fuel gas to be reacted; an air electrode for allowing a gas containing oxygen to be reacted; an electrolyte film provided between the fuel electrode and the air electrode; and a reaction prevention film provided between the air electrode and the electrolyte film. The porosity of the reaction prevention film is less than 10%, particularly preferably "closed pore-ratio" is 50% or more. The diameter of closed pores in the reaction prevention film is 0.1 to 3 μm. The reaction prevention film includes closed pores each containing a component (e.g., Sr) for the air electrode. This can provide an SOFC in which a decrease in output due to an increase in electric resistance between an air electrode and a solid electrolyte film hardly occurs even after long-term use.

8 Claims, 1 Drawing Sheet

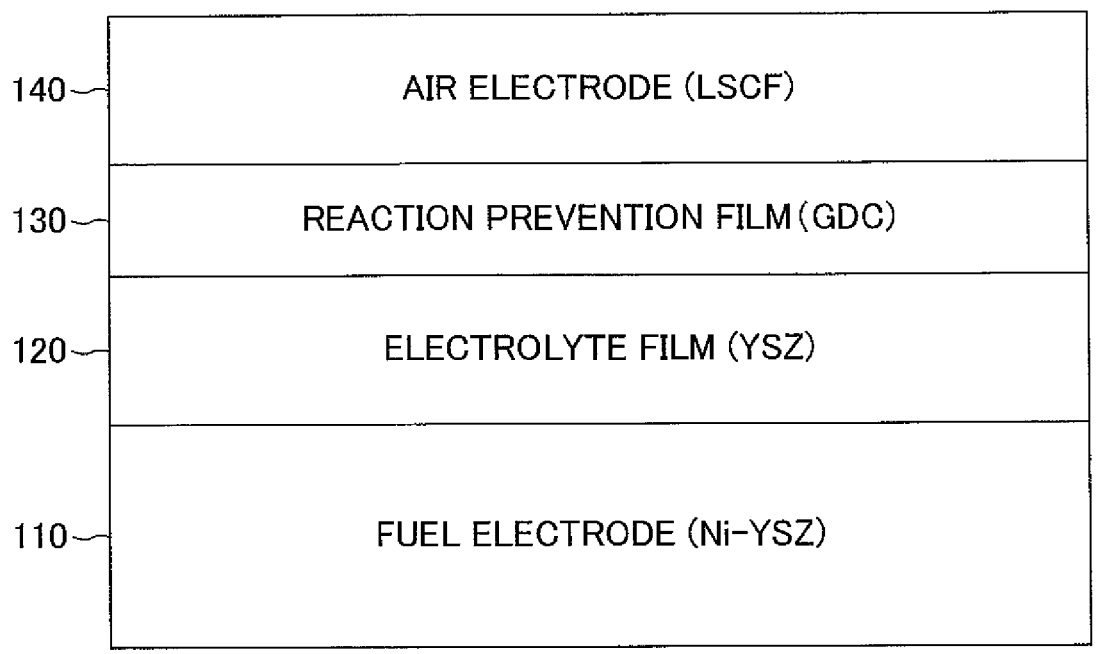

SOLID OXIDE FUEL CELL

BACKGROUND OF THE INVENTION

1. Field of the Invention

The present invention relates to a solid oxide fuel cell (SOFC).

2. Description of the Related Art

An SOFC includes a fuel electrode for allowing a fuel gas to be reacted, an air electrode for allowing a gas containing oxygen to be reacted, and a solid electrolyte film provided between the fuel electrode and the air electrode (see, for example, Japanese Patent Application Laid-open No. 2010-003478). When a fuel gas (e.g., hydrogen gas) and a gas containing oxygen (e.g., air) are supplied to the fuel electrode and the air electrode of the SOFC at high temperature (e.g., 500 to 1,000° C.), respectively, chemical reactions represented by the following formulae (1) and (2) occur. Through the chemical reactions, a difference in electric potential is generated between the fuel electrode and the air electrode. The difference in electric potential is originated from oxygen conductivity of a solid electrolyte.

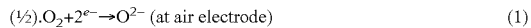

$$(1/2).O_2 + 2e^- \rightarrow O^{2-} \text{ (at air electrode)} \quad (1)$$

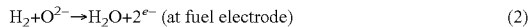

$$H_2 + O^{2-} \rightarrow H_2O + 2e^- \text{ (at fuel electrode)} \quad (2)$$

In general, there may occur a phenomenon in which a reaction layer having large electric resistance is formed at the interface between the air electrode and the solid electrolyte film of the SOFC which operates at high temperature through a reaction of components for the air electrode and the solid electrolyte film. Specifically, for example, when lanthanum strontium cobalt ferrite (LSCF) is used as a material for the air electrode and yttria-stabilized zirconia (YSZ) is used as a material for the solid electrolyte film, it is known that a high-resistance layer (SrZrOx) is liable to be formed through a reaction of strontium (Sr) in LSCF and zirconium (Zr) in YSZ. Moreover, it is also known that a high-resistance layer ($La_2Zr_2O_7$) is liable to be formed through a reaction of lanthanum (La) in LSCF and zirconium (Zr) in YSZ.

Formation of the high-resistance layer may be one of the causes for increasing interfacial resistance between the air electrode and the solid electrolyte film to decrease an output of the SOFC. Therefore, it is preferred to suppress the formation of the high-resistance layer. From this point of view, in the SOFC described in the above-mentioned literature, a porous reaction prevention film including ceria (e.g., gadolinium-doped ceria (GDC)) is provided between the solid electrolyte film and the air electrode. The porosity of the reaction prevention film is set to 10 to 80%.

In addition, in the SOFC according to the above-mentioned literature, a precipitate, which is formed through precipitation of a "component for the air electrode," is entrapped (accumulated) in pores of the porous reaction prevention film. Thus, the "component for the air electrode," which moves in the reaction prevention film through diffusion, is unlikely to reach the interface between the reaction prevention film and the solid electrolyte film so that the formation of the high-resistance layer is suppressed surely, according to the above-mentioned literature.

SUMMARY OF THE INVENTION

Meanwhile, as a result of studies, it has been found that the long-term use of the SOFC according to the above-mentioned literature is liable to cause a decrease in output of the SOFC. A possible reason for this resides in that, owing to the fact that the porosity of the porous reaction prevention film is as relatively large as 10 to 80%, the "component for the air electrode" is likely to reach the interface between the reaction prevention film and the solid electrolyte film through grain boundaries in the reaction prevention film through diffusion, and thus the high-resistance layer is liable to be formed through encounter of the "component for the air electrode" and the "component for the solid electrolyte film" in the vicinity of the interface (the details are described later).

The present invention has been made to deal with the above-mentioned problem. An object of the present invention is to provide an SOFC in which a decrease in output of the SOFC due to an increase in electric resistance between an air electrode and a solid electrolyte film hardly occurs after long-term use.

An SOFC according to the present invention includes: a fuel electrode for allowing a fuel gas to be reacted; an air electrode for allowing a gas containing oxygen to be reacted; a solid electrolyte film provided between the fuel electrode and the air electrode; and a reaction prevention film provided between the air electrode and the solid electrolyte film. In this case, the reaction prevention film may include cerium. The solid electrolyte film may include zirconium. The air electrode may include a perovskite-type oxide including at least one of strontium and lanthanum.

In the SOFC according to the present invention, the reaction prevention film has a porosity of less than 10%, and the reaction prevention film includes pores each containing the component for the air electrode. The reaction prevention film more preferably has a porosity of 7% or less. It is preferable that the reaction prevention film includes the pores uniformly scattered therein. The plural pores existing in the reaction prevention film may consist of only open pores, only closed pores, or both open pores and closed pores. In a case where the reaction prevention film, that is provided between the air electrode and the solid electrolyte film, is configured to consist of more than two layers, the layers must include one or more layers that have a porosity of less than 10% and include pores each containing the component for the air electrode. Moreover, the reaction prevention film and the solid electrolyte film are suitably formed by simultaneous sintering.

According to the configuration described above, it has been found that a decrease in output of the SOFC due to an increase in electric resistance between the air electrode and the solid electrolyte film hardly occurs after long-term use. A possible reason for this resides in that, owing to the fact that the porosity of the reaction prevention film is as relatively small as less than 10% (preferably 7% or less), the "component for the air electrode" (e.g., Sr) is unlikely to reach the interface between the reaction prevention film and the solid electrolyte film through grain boundaries in the reaction prevention film through diffusion as compared to the SOFC described in the above-mentioned literature (in the literature, the porosity of the reaction prevention film is 10 to 80%), and thus the high-resistance layer is unlikely to be formed through a reaction of the "component for the air electrode" (e.g., Sr) and the "component for the solid electrolyte film" (e.g., Zr) in the vicinity of the interface (the details are described later).

Another possible reason resides in that the "component for the air electrode," which moves in the reaction prevention film through diffusion, may be entrapped (accumulated) in pores of the reaction prevention film, and thus the "component for the air electrode" is unlikely to reach the interface between the reaction prevention film and the solid electrolyte film, with the result that the high-resistance layer is unlikely to be formed through a reaction of the "component for the air electrode" (e.g., Sr) and the "component for the solid electrolyte film" (e.g., Zr) in the vicinity of the interface (the details are described later).

In the SOFC according to the present invention described above, the reaction prevention film suitably includes closed pores each having a diameter of 0.1 to 3 μm. Moreover, the reaction prevention film suitably has a thickness of 0.5 to 25 μm.

BRIEF DESCRIPTION OF THE DRAWINGS

FIG. 1 is a schematic view illustrating the configuration of an SOFC according to an embodiment of the present invention.

DETAILED DESCRIPTION OF THE INVENTION (Configuration)

FIG. 1 is a schematic view illustrating the configuration of an SOFC according to an embodiment of the present invention. The SOFC is a laminate including a fuel electrode 110, an electrolyte film 120 laminated on the fuel electrode 110, a reaction prevention film 130 laminated on the electrolyte film 120, and an air electrode 140 laminated on the reaction prevention film 130. As viewed from above, the cell has a square shape with a side length of 1 to 30 cm, a rectangular shape with a long side length of 5 to 30 cm and a short side length of 3 to 15 cm, or a circular shape with a diameter of 1 to 30 cm. The thickness of the cell is 0.1 to 3 mm.

The fuel electrode 110 (anode electrode) is, for example, a porous thin-plate-like sintered body including nickel oxide (NiO) and yttria-stabilized zirconia (YSZ). The fuel electrode 110 may include nickel oxide (NiO) and yttria ($Y_2O_3$). The fuel electrode 110 has a thickness of 0.1 to 3 mm. The thickness of the fuel electrode 110 is the largest among the thicknesses of components for the cell, and thus, the fuel electrode 110 functions as a support substrate for the cell. The fuel electrode 110 is subjected to a well-known reduction treatment (e.g., treatment for reducing NiO to Ni), resulting in exhibiting conductivity. The SOFC operates in a state in which the fuel electrode 110 exhibits conductivity as described above.

The fuel electrode 110 may include two layers including: a fuel-electrode active portion, which is brought into contact with the electrolyte film 120; and a fuel-electrode current-collecting portion, which corresponds to the residual portion of the fuel electrode except the fuel-electrode active portion. The fuel-electrode active portion may include nickel oxide (NiO) and yttria-stabilized zirconia (YSZ). Alternatively, the fuel-electrode active portion may include nickel oxide (NiO) and gadolinium-doped ceria (GDC). The fuel-electrode current-collecting portion may include nickel oxide (NiO) and yttria-stabilized zirconia (YSZ), for example. Alternatively, the fuel-electrode current-collecting portion may include nickel oxide (NiO) and yttria ($Y_2O_3$).

As described above, the fuel-electrode current-collecting portion includes a substance having electron conductivity. The fuel-electrode active portion includes a substance having electron conductivity and a substance having oxygen ion conductivity. The "volume ratio of the substance having oxygen ion conductivity relative to the total volume except the pores" in the fuel-electrode active portion is larger than the "volume ratio of the substance having oxygen ion conductivity relative to the total volume except the pores" in the fuel-electrode current-collecting portion.

The electrolyte film 120 is a dense thin-plate-like sintered body including a zirconium-containing material, e.g., YSZ. The electrolyte film 120 has a thickness of 3 to 30 μm.

The reaction prevention film 130 is a thin-plate-like sintered body including ceria. Specific examples of the ceria include gadolinium-doped ceria (GDC) and samarium-doped ceria (SDC). The reaction prevention film 130 is interposed between the electrolyte film 120 and the air electrode 140 in order to suppress a phenomenon that a high-resistance layer is formed between the electrolyte film 120 and the air electrode 140 through a reaction of zirconium (Zr) in the electrolyte film 120 and strontium (Sr) in the air electrode 140 during cell production or during SOFC operation.

The thickness of the reaction prevention film 130 is 0.5 to 25 μm. The detail configuration of the reaction prevention film 130 and actions and effects of the configuration are described in detail later.

The air electrode 140 (cathode electrode) is, for example, a porous thin-plate-like sintered body including a perovskite-type oxide. As the perovskite-type oxide, there may be adopted lanthanum strontium cobalt ferrite LSCF ((La, Sr)(Co, Fe)$O_3$), lanthanum strontium ferrite (LSF=(La, Sr)FeO$_3$), lanthanum nickel ferrite (LNF=La(Ni, Fe)O$_3$), lanthanum strontium cobaltite (LSC=(La, Sr)CoO$_3$), or the like. The air electrode 140 has a thickness of 10 to 100 μm.

The outline of the configuration of the SOFC illustrated in FIG. 1 is as described above. A plurality of SOFCs may be electrically connected in series via current-collecting members (interconnectors) and utilized. This allows a large output to be provided. As an exemplary embodiment in which a plurality of SOFCs are electrically connected in series, there may be adopted a mode in which a plurality of "power-generating portions as laminates of a fuel electrode, an electrolyte film, and an air electrode" are laminated in a lamination direction (so-called "vertical stripe type"), or a mode in which the power-generating portions are disposed at different portions on the surface of a plate-like support, respectively (so-called "horizontal stripe (segmented-in-series) type").

(Manufacturing Method)

Then, an exemplary manufacturing method for the SOFC illustrated in FIG. 1 is described. Hereinafter, the term "green body" means a state before sintering. First, a green body of the fuel electrode 110 was formed as described below. Namely, an NiO powder and a YSZ powder were mixed with each other. Then, polyvinyl alcohol (PVA) was added as a binder to the mixture to produce a slurry. The slurry was dried and granulated with a spray dryer to obtain a powder for the fuel electrode. The powder was molded by press molding with a mold to form a green body of the fuel electrode 110.

Then, a green body of the electrolyte film 120 was laminated and formed on the upper surface of the green body of the fuel electrode 110 as described below. Namely, water and a binder were added to a YSZ powder, and the mixture is blended in a ball mill for 24 hours to produce a slurry. The slurry is coated and dried on the upper surface of the green body of the fuel electrode 110 to form a green body (film) of the electrolyte film 120. It should be noted that, in the formation of the green body of the electrolyte film 120 on the upper surface of the green body of the fuel electrode 110, a tape lamination method, a printing method, and the like may be employed.

Then, a green body of the reaction prevention film 130 was formed on the upper surface of the green body of the electrolyte film 120 as described below. Namely, solvent, a binder, a dispersing agent, and a plasticizing agent were added to a mixture including a GDC powder and pore-producing material such as PMMA. The mixture was blended in a ball mill for 24 hours to produce a slurry. The slurry was shaped in a film on the upper surface of the green body of the electrolyte film 120 by a printing method and the like. This green body was dried at 120° C. for 30 minutes to form a green body (film) of the reaction prevention film 130. It should be noted that, in the formation of the green body of the reaction prevention film 130 on the upper surface of the green body of the electrolyte film 120, a tape lamination method, and the like may be employed. It is preferred to use a material having an average particle diameter of 0.2 to 2.0 μm (preferably 0.6 to 1.2 μm) and a specific surface area of 3 to 20 $m^2/g$ (preferably 7 to 13 $m^2/g$) as the GDC powder. It is preferred to use a material having an average particle diameter of 0.2 to 5.0 μm (preferably 0.5 to 2.5 μm) as the pore-producing material.

As described above, a laminate (before sintering) of the green body of the fuel electrode 110, the green body of the electrolyte film 120, and the green body of the reaction prevention film 130 was formed. The laminate (before sintering) was co-sintered at 1,300 to 1,600° C. for 1 to 20 hours or at 1,380 to 1,480° C. for 5 to 10 hours to obtain a laminate (after sintering) of the porous fuel electrode 110, the dense electrolyte film 120, and the reaction prevention film 130. As described above, the reaction prevention film 130 (after sintering) is formed by the co-sintering with the electrolyte film 120.

Then, an air electrode 140 was formed on the upper surface of the reaction prevention film 130 of the laminate (after sintering) as described below. Namely, water and a binder were added to an LSCF powder, and the mixture was blended in a ball mill for 24 hours to produce a slurry. The slurry was coated and dried on the upper surface of the reaction prevention film 130, and sintered at 1,000° C. for 1 hour in air in an electric furnace (in an oxygen-containing atmosphere) to form a porous air electrode 140 on the upper surface of the reaction prevention film 130. So far, the exemplary manufacturing method for the SOFC illustrated in FIG. 1 has been described.

(Details of Reaction Prevention Film)

Then, the reaction prevention film 130 of the SOFC illustrated in FIG. 1 is described in detail. The reaction prevention film 130 includes only one layer of a porous layer. The boundary (interface) between the reaction prevention film 130 and the electrolyte film 120 is defined as described below. First, line analysis in a thickness direction is conducted with EPMA for the cross-section in the thickness direction of a laminated portion including the reaction prevention film 130 and the electrolyte film 120. According to the line analysis, the concentration distribution data of each element is obtained. Based on the concentration distribution data, the position of the line at which the concentration of cerium is consistent with the concentration of zirconium is the boundary (interface) between the reaction prevention film 130 and the electrolyte film 120.

The pores (closed pores) in the reaction prevention film 130 are uniformly scattered in the reaction prevention film 130. Herein, the term "uniformly scattered" means that numerous closed pores exist in the reaction prevention film 130 in separation from one another and the distances between the adjacent closed pores are uniform in both the thickness direction and the planer direction of the film. The plural pores uniformly scattered in the reaction prevention film 130 consist of only open pores, only closed pores, or both open pores and closed pores. The porosity of the reaction prevention film 130 is less than 10% (1 to 10%), more preferably 7% or less. Herein, the porosity of the reaction prevention film 130 means a "volume ratio of pores (voids) relative to the total volume of the reaction prevention film 130." Notably, in a case where the reaction prevention film consists of more than two layers, each porosity (volume ratio of pores (voids) relative to the total volume of each layer) will be calculated separately for each layer.

For example, the porosity of the reaction prevention film 130 can be calculated by obtaining an SEM image of the cross-section in a thickness direction of the reaction prevention film 130. Namely, first, a plurality of pores (closed pores) located in the region corresponding to the reaction prevention film 130 in the SEM image (visual field) are specified. Then, the total area of the region corresponding to the reaction prevention film 130 in the SEM image is obtained. Then, the sum of areas of the plurality of specified pores in the SEM image is obtained. The porosity of the reaction prevention film 130 is calculated by dividing the "sum of areas of the plurality of pores" by the total area of the region corresponding to the reaction prevention film 130." A technique for estimating a three-dimensional structure from a two-dimensional structure as described above is described in detail in "Tadayasu Mizutani, Yoshiharu Ozaki, Toshio Kimura, Takashi Yamaguchi, "Ceramic Processing," GIHODO SHUPPAN Co., Ltd., published on Mar. 25, 1985, pp. 190-201." Notably, the technique for estimating a three-dimensional structure from a two-dimensional structure as described above can be also applied to calculations of "closed pore-ratio" described below.

One porosity calculated based on one image (visual field) obtained from one cross-section may be regarded as the porosity of the entire reaction prevention film, or an average value of a plurality of porosities respectively calculated based on a plurality of images (visual fields) respectively obtained from a plurality of cross-sections may be regarded as the porosity of the entire reaction prevention film.

Moreover, the diameter of each of numerous pores (closed pores or open pores) in the reaction prevention film 130 is 0.1 to 3 μm. Herein, the diameter of a pore (closed pore) is, for example, a diameter of a circle having an area equal to that of the region corresponding to the pore in the SEM image, for example.

The adjustment of the porosity of the reaction prevention film 130 can be achieved by adjusting the powdery characteristics (particle diameter and specific surface area) of a powder as a raw material (e.g., GDC) for the reaction prevention film, the slurry characteristics (solid-liquid ratio and composition of organic materials such as a binder), and the like.

Specifically, for example, as the solid-liquid ratio of the slurry for the reaction prevention film 130 (ratio of a solid, that is, a raw material for the reaction prevention film in the whole slurry) becomes larger, the density of a green body becomes higher and thus the porosity of the reaction prevention film 130 after sintering becomes smaller. Alternatively, as the specific surface area of the powdery material (e.g., GDC) for the reaction prevention film 130 becomes larger, the porosity of the reaction prevention film 130 becomes smaller owing to an increase in sintering performance.

Hereinafter, a ratio of "the number of closed pores existing in the reaction prevention film 130" relative to the total number of pores (closed pores and open pores) existing in the film 130 will be referred to as "closed pore-ratio". An adjustment of the "closed pore-ratio" can be achieved by adjusting a "filling rate of powders" of the green body (film) of the reaction prevention film 130. The "filling rate of powders" is defined as a ratio of a density of dried green body relative to a density of ceramics powder (physicality value).

Specifically, in order to increase the "closed pore-ratio" (=increase the number of closed pores), it is preferable that the "filling rate of powders" will be controlled to fall within 38 to 63%. Meanwhile, in order to reduce the "closed pore-ratio" (=increase the number of open pores), it is preferable that the "filling rate of powders" will be controlled to fall into less than 38%.

In addition, it is confirmed that the component for the air electrode 140 (LSCF) may be contained in the pores (closed pores or open pores) of the reaction prevention film 130. Specifically, it is confirmed that Sr (one of the components for the air electrode 140 (LSCF)) and La, Co, and Fe (other components for the air electrode 140 (LSCF)) may be contained in the pores (closed pores) of the reaction prevention film 130. The confirmation can be achieved by well-known element mapping using an SEM image.

The components present in the pores (closed pores) of the reaction prevention film 130 as described above are not present in the slurry for the reaction prevention film 130. Namely, it is considered that those components are components (precipitates) that have moved into the pores (closed pores) of the reaction prevention film 130 from the air electrode 140 by the "diffusion through grain boundaries in the reaction prevention film 130" during SOFC production or during SOFC operation.

(Actions and Effects)

Then, actions and effects of the reaction prevention film 130 of the SOFC according to the embodiment are described. In order to describe the actions and effects of the reaction prevention film 130 according to the embodiment, an SOFC described in Japanese Patent Application Laid-open No. 2010-003478 described above is introduced as a comparative embodiment.

The configuration of the SOFC according to the comparative embodiment is different only in the porosity of the reaction prevention film 130 from the configuration of the SOFC according to the embodiment. Namely, in the SOFC according to the embodiment, the porosity of the reaction prevention film 130 (one layer of the porous layer) is less than 10%, while in the SOFC according to the comparative embodiment, the porosity of the reaction prevention film 130 (one layer of the porous layer) is 10 to 80%.

It was confirmed that the components (precipitates) for the air electrode 140 (LSCF) such as Sr and La were contained in the pores (specifically, open pores) of the reaction prevention film 130 (one layer of the porous layer) of the SOFC according to the comparative embodiment in the same manner as the reaction prevention film 130 (one layer of the porous layer) of the SOFC according to the embodiment.

Further, as described above, in the SOFC according to the embodiment, the reaction prevention film 130 (after sintering) is formed by the co-sintering (1,300 to 1,600° C.) with the electrolyte film 120, while in the SOFC according to the comparative embodiment, the reaction prevention film 130 (after sintering) is formed by the co-sintering (1,000° C.) with the air electrode 140. Namely, in the SOFC according to the embodiment, the sintering temperature of the electrolyte film 120 is equal to the sintering temperature of the reaction prevention film 130, while in the SOFC according to the comparative embodiment, the sintering temperature of the reaction prevention film 130 is lower than the sintering temperature of the electrolyte film 120.

(Evaluation of Decrease in Output of SOFC)

The inventor has found that, in the SOFC according to the embodiment, a decrease in output of the SOFC hardly occurs after the long-term use in comparison with the SOFC according to the comparative embodiment. Hereinafter, an examination for verification of the fact is described.

In this examination, a plurality of samples having different combinations of porosities, closed pore-ratio, and thicknesses of reaction prevention films (GDC) were prepared for each of the SOFC according to the embodiment and the SOFC according to the comparative embodiment. Specifically, 16 kinds of standards (combinations) were prepared as shown in Table 1. In Table 1, cases where the reaction prevention film has a porosity of 10 to 80% (standards 1 to 6) each correspond to the comparative embodiment and cases where the reaction prevention film has a porosity of less than 10% (standards 7 to 16) each correspond to the embodiment.

TABLE 1

| | Construction | | | Evaluation results | |
|---|---|---|---|---|---|
| Standard | Thickness of reaction prevention film (μm) | Porosity of reaction prevention film (%) | Closed pore-ratio (%) | Cell voltage decay rate (%) | Judgement |
| 1 | 5 | 10 | 0 | 5.2 | x |
| 2 | 10 | 28 | 0 | 6.0 | x |
| 3 | 5 | 45 | 0 | 6.3 | x |
| 4 | 10 | 60 | 0 | 4.8 | x |
| 5 | 15 | 72 | 0 | 5.5 | x |
| 6 | 20 | 80 | 0 | 6.5 | x |
| 7 | 10 | 9.8 | 43 | 0.85 | ○ |
| 8 | 10 | 8.5 | 32 | 0.62 | ○ |
| 9 | 15 | 7.0 | 50 | 0.35 | ◎ |
| 10 | 15 | 6.2 | 62 | 0.28 | ◎ |
| 11 | 20 | 4.5 | 73 | 0.32 | ◎ |
| 12 | 20 | 2.8 | 85 | 0.20 | ◎ |
| 13 | 25 | 1.2 | 95 | 0.15 | ◎ |
| 14 | 0.5 | 9.5 | 10 | 0.78 | ○ |
| 15 | 3 | 7.5 | 23 | 0.70 | ○ |
| 16 | 5 | 5.5 | 78 | 0.25 | ◎ |

In these samples, the thicknesses of the fuel electrode 110 (Ni-YSZ), the electrolyte film 120 (YSZ), and the air electrode 140 (LSCF) were kept constant at 500 μm, 5 μm, and 50 μm, respectively. Each sample had a circular shape with a diameter of 30 mm as viewed from above. In the standards 7 to 16 in Table 1, the diameter (minimum value to maximum value) of each of the closed pores in the reaction prevention film 130 was 0.1 to 3 μm.

The temperature of each sample was increased to 800° C. while nitrogen gas was supplied to the fuel electrode 110 side and air was supplied to the air electrode 140 side. Then, when the temperature reached 800° C., a reduction treatment was conducted for 3 hours while hydrogen gas was supplied to the fuel electrode 110. After the reduction treatment, an endurance test was conducted. In the endurance test, a change rate in voltage of the SOFC was evaluated under a constant current condition at a constant current density of 0.3 A/cm$^2$. Herein, the change rate (%) in voltage per 1,000 hours is defined as a "cell voltage decay rate." It is considered that a small "cell voltage decay rate" means a small change rate in resistance of the entire SOFC, that is, a small increase in electric resistance of the reaction prevention film.

As can be understood from Table 1, the cell voltage decay rate of the SOFC according to the embodiment is extremely smaller than the cell voltage decay rate of the SOFC according to the comparative embodiment. Namely, it can be said that an increase in electric voltage of the reaction prevention film 130 after the endurance test of the SOFC according to the embodiment is smaller than that of the SOFC according to the comparative embodiment.

Such results were obtained possibly because of the following reason. Namely, in the comparative embodiment, owing to the fact that the porosity of the reaction prevention film 130

(one layer of the porous layer) is as relatively large as 10 to 80%, the "component for the air electrode 140" (e.g., Sr) is likely to diffuse in the reaction prevention film 130. Therefore, the "component for the air electrode 140" is likely to pass through the reaction prevention film 130 to reach the interface between the reaction prevention film 130 and the electrolyte film 120 through diffusion. Thus, after the long-term use (after the endurance test), a high-resistance layer (e.g., SrZrOx) is liable to be formed through encounter of the "component for the air electrode 140" (e.g., Sr) and the "component for the electrolyte film 120" (e.g., Zr) in the vicinity of the interface. As a result, it is considered that after the long-term use (after the endurance test), the electric resistance of the reaction prevention film 130 is liable to increase.

In the SOFC according to the embodiment, in contrast, owing to the fact that the porosity of the reaction prevention film 130 (one layer of the porous layer) is as relatively small as less than 10%, the "component for the air electrode 140" (e.g., Sr) is unlikely to diffuse through the grain boundaries in the reaction prevention film 130. Therefore, the "component for the air electrode 140" is unlikely to diffuse to reach the interface between the reaction prevention film 130 and the electrolyte film 120 through the grain boundaries in the reaction prevention film 130. Thus, even after the long-term use (after the endurance test), a high-resistance layer (e.g., SrZrOx) is unlikely to be formed through a reaction of the "component for the air electrode 140 (e.g., Sr) and the "component for the electrolyte film 120" (e.g., Zr) in the vicinity of the interface. As a result, it is considered that even after the long-term use (after the endurance test), the electric resistance of the reaction prevention film 130 is unlikely to increase.

In addition, As can be understood from Table 1, in a case where the "closed pore-ratio" of the reaction prevention film 130 is more than 50%, the electric resistance of the reaction prevention film 130 is unlikely to increase after a long period use (after an endurance test). This was obtained possibly because of the following reason. Namely, the "component for the air electrode 140" (e.g., Sr), which moves in the reaction prevention film 130 through diffusion, is unlikely to be entrapped (accumulated) in the open pores of the reaction prevention film 130, but is likely to be entrapped (accumulated) in the closed pores of the reaction prevention film 130. Therefore, the "component for the air electrode 140" becomes unlikely to reach the interface between the reaction prevention film 130 and the electrolyte film 120, in a case where the "closed pore-ratio" is large.

As for the open pores, what we call "vapor-phase diffusion" through open pores themselves (specifically vapor-phase) can easily occur. Therefore, the "component for the air electrode 140" (e.g., Sr) is likely to diffuse in the reaction prevention film 130 through the open pores. In contrast, as for the closed pores, what we call "solid-phase diffusion" through grain boundaries (specifically solid-phase) can easily occur, but the "vapor-phase diffusion" cannot easily occur. A diffusion speed based on the solid-phase diffusion is quite faster than that based on the vapor-phase diffusion. Accordingly, the "component for the air electrode 140" (e.g., Sr) is unlikely to diffuse in the reaction prevention film 130. Also due to this, the "component for the air electrode 140" becomes unlikely to reach the interface between the reaction prevention film 130 and the electrolyte film 120, in a case where the "closed pore-ratio" is large.

In the above-described examination, GDC was used as a material of the reaction prevention film 130. It is confirmed that similar results can be obtained when SDC is used. In the above-described examination, the reaction prevention film 130 (film between the electrolyte film 120 and the air electrode 140) was used which consists of only one layer of the porous layer. In contrast, a reaction prevention film (film between the electrolyte film 120 and the air electrode 140) may consist of plural layers (which are different in composition, or which are same in composition, but different in microstructure). In this case, It is also confirmed that similar results can be obtained when the plural layers includes at least one layer that have a porosity of less than 10% and comprise pores each containing a component for the air electrode 140 (preferably the closed pore-ratio is more than 50%).

What is claimed is:

1. A solid oxide fuel cell, comprising:
a fuel electrode for allowing a fuel gas to be reacted;
an air electrode for allowing a gas containing oxygen to be reacted;
a solid electrolyte film provided between the fuel electrode and the air electrode; and
a reaction prevention film provided between the air electrode and the solid electrolyte film,
wherein:
the reaction prevention film has a porosity of less than 10%;
the reaction prevention film comprises pores each containing a component for the air electrode; and
a closed pore-ratio, which is a ratio of the number of closed pores existing in the reaction prevention film relative to the total number of pores existing in the reaction prevention film, is more than 50%.

2. A solid oxide fuel cell according to claim 1, wherein the reaction prevention film comprises closed pores each having a diameter of 0.1 to 3 μm.

3. A solid oxide fuel cell according to claim 1, wherein the reaction prevention film has a thickness of 0.5 to 25 μm.

4. A solid oxide fuel cell according to claim 1, wherein the reaction prevention film and the solid electrolyte film are formed by simultaneous sintering.

5. A solid oxide fuel cell according to claim 1, wherein the reaction prevention film comprises cerium.

6. A solid oxide fuel cell according to claim 1, wherein the solid electrolyte film comprises zirconium.

7. A solid oxide fuel cell according to claim 1, wherein the air electrode comprises a perovskite-type oxide containing at least one of strontium and lanthanum.

8. A solid oxide fuel cell according to claim 1, wherein the pores in the reaction prevention film are uniformly scattered in the reaction prevention film.

* * * * *